(12) United States Patent
Brustoloni et al.

(10) Patent No.: US 6,886,103 B1
(45) Date of Patent: Apr. 26, 2005

(54) METHOD AND APPARATUS FOR EXTENDING NETWORK ADDRESS TRANSLATION FOR UNSUPPORTED PROTOCOLS

(75) Inventors: Jose C. Brustoloni, Westfield, NJ (US); Juan Alberto Garay, West New York, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 893 days.

(21) Appl. No.: 09/698,973

(22) Filed: Oct. 27, 2000

Related U.S. Application Data

(60) Provisional application No. 60/162,090, filed on Oct. 28, 1999.

(51) Int. Cl.[7] .................................................. H04L 9/00
(52) U.S. Cl. ........................ 713/201; 713/160; 713/201
(58) Field of Search ................................. 370/352, 392, 370/401; 709/217, 219, 229, 226; 713/160, 201

(56) References Cited

U.S. PATENT DOCUMENTS 6,631,402 B1 * 10/2003 Devine et al. ............... 709/217
6,697,354 B1 *  2/2004 Borella et al. .............. 370/352

OTHER PUBLICATIONS

S. Kent and R. Atkinson, "Security Architecture for the Internet Protocol," IETF, RFC 2401, Nov. 1998.
S. Deering and R. Hinden, "Internet Protocol, Version 6 (Ipv6) Specification," IETF, RFC 2460, Dec. 1998.
S. Kent and R. Atkinson, "IP Authentication Header," IEFT, RFC 2402, Nov. 1998.
S. Kent and R. Atkinson, "IP Encapsulating Security Payload (ESP)," IEFT, RFC 2406, Nov. 1998.
D. Maughan, M. Scherlter, M. Schneider and J. Turner, "Internet Security Association and Key Management Protocol (ISAKMP)," IETF, RFC 2408, Nov. 1998.

(Continued)

*Primary Examiner*—Gregory Morse
*Assistant Examiner*—Ellen Tran
(74) *Attorney, Agent, or Firm*—Stephen M. Gurey

(57) ABSTRACT

Clients that are connected on a private network and which are assigned a private IP address that is not routable on the Internet can connect to the Internet through a router/server that includes a network address translator (NAT). For outgoing packets, the NAT translates the client's private source IP address and generalized port number (GPN) to the NAT's global IP address and GPN. For incoming packets sent to the NAT's global IP address and GPN, the NAT translates the global destination IP address and GPN to the client's private IP address and GPN. For protocols which cannot be directly supported by the NAT, such as those in the IPSec security protocol suite, the NAT is extended by creating in the NAT's translation table an entry that associates, for a specific unsupported protocol, a client's private IP address and GPN, the NAT's global IP address and GPN, and a foreign address on the Internet, that is valid until a specified or default expiration time. Outgoing packets from the client to that foreign address and incoming packets from that foreign address to the NAT's global IP address and GPN are translated according to the entry until the entry expires. In associations with these translations to outgoing and incoming packets, the client implements any Application Layer Gateway (ALG) that would otherwise be implemented at the NAT. Further, at the client, outgoing packets are modified before being transmitted so as to pre-compensate for the effects of the translations. Incoming packets at the client from the NAT are similarly modified so as to post-compensate for the effects of the translations. For the IPSec protocol, these modification include adjusting the checksum in the TCP or UDP header to account for IP address and TCP or UDP port number translations.

27 Claims, 7 Drawing Sheets

OTHER PUBLICATIONS

C. Madson and R. Glenn, "The Use of HMAC–MD5–96 within ESP and AH," IETF, RFC 2403, Nov. 1998.

C. Madson and N. Doraswamy, "The ESP DES–CBC Cipher Algorithm with Explicit IV," IETF, RFC 2405, Nov. 1998.

D. Harkins and D. Carrel, "The Internet Key Exchange (IKE)," IETF, RFC 2409, Nov. 1998.

C. Madson and R. Glenn, "The Use of HMAC–SHA–1–96 within ESP and AH," RFC 2404, Nov. 1998.

* cited by examiner

| PROTOCOL | PRIVATE IP ADDRESS | PRIVATE GPN | GLOBAL IP ADDRESS | GLOBAL GPN | FOREIGN ADDRESS | EXPIRATION |
|---|---|---|---|---|---|---|
| 601 | 602 | 603 | 604 | 605 | 606 | 607 |

METHOD AND APPARATUS FOR EXTENDING NETWORK ADDRESS TRANSLATION FOR UNSUPPORTED PROTOCOLS

CROSS-REFERENCE

This application claims the benefit of U.S. Provisional Application No. 60/162,090, filed Oct. 28, 1999.

This application also describes and claims subject matter that is in co-pending United States patent application filed simultaneously herewith and entitled: "METHOD AND APPARATUS FOR APPLICATION-INDEPENDENT END-TO-END SECURITY IN SHARED-LINK ACCESS NETWORKS," Ser. No. 09/698,978.

TECHNICAL FIELD

This invention relates to packet-based data communications on IP networks, and more particularly, to network address translation that enables communications between clients on a shared line or private network and servers on a global network such as the Internet.

BACKGROUND OF THE INVENTION

A plurality of clients can share a single access link to the Internet or other IP network by using network address and port translation (NAT). In accordance with NAT, the clients on a private network are assigned individual IP addresses from a pool of IP addresses reserved by the Internet Assigned Numbers Authority (IANA) for non-exclusive private network use. Private addresses are not routable on the Internet. When a client on the private network wants to communicate with a server on a global network, such as the Internet, a globally unique and routable IP address must be used instead of the client's local non-routable private IP address. Typically, a private network is connected to the Internet via a router and shared access link to an Internet Service Provider (ISP). NAT is a feature that may be implemented in the router and that provides unambiguous translations between private and global addresses, allowing the plural clients to share the access link. When a client sends a packet to a foreign address (i.e., one not in the private network), NAT modifies the packet header, substituting the client's private source IP address and generalized port number (GPN) by a global IP address and GPN. Depending upon the protocol being used, GPN is a certain field in the packet header. For example, for the TCP or UDP protocols, the GPN is the TCP or UDP port number. For other protocols, the GPN may be another field. A single global IP address may be shared as the source address of packets sent by all or some of the clients to the Internet. In order to properly route incoming packets sent from a foreign address on the Internet to a client on the private network, NAT maintains in a translation table, stored in memory, the one-to-one correspondence between private and global IP addresses and GPNs. When NAT receives a packet from the Internet, NAT modifies the packet header's destination from global to private (IP address, GPN) values, according the NAT's translation table, allowing the packet to reach the respective client in the private network. Some application-layer protocols may also include IP addresses and possibly port numbers in packet payloads. Such addresses and port numbers must also be similarly translated. For each such protocol, NAT includes an Application Level Gateway (ALG) program that provides these additional necessary translations. Furthermore, when the NAT performs its translations, the packet checksum in the transport layer TCP or UDP header of the packet is correspondingly modified to reflect the changes resulting from the translations. Thus, when the packet is eventually received at its destination, its checksum will be correct if there are no transmission errors.

The use of network address translation presents difficulties when it does not or cannot support a particular protocol that a client is desirous of using. As an example, certain security architectures have not been able to be fully interoperable with NAT. Security protocols are extremely useful in determining whether or not a received packet has been corrupted in some manner between the client/servers from which it is transmitted and received. In order to prevent packet forgery and snooping, authentication and encryption of packets may be used, respectively. Various security protocols may be used for authentication and/or encryption. Some protocols can be used in conjunction with NAT, for example the Secure Shell (SSH), Secure Sockets Layers (SSL), and Point-to-Point Tunneling Protocol (PPTP). Disadvantageously, however, SSH and SSL implement security in the application layer and are thus application-dependent, whereas PPTP's security is often considered deficient. On the other hand, IP Security (IPSec) operates at the network layer and therefore is independent of the transport- (e.g., TCP or UDP) or application-layer protocol (e.g., HTTP, FTP, or TELNET). It is thus application-independent and therefore capable of providing end-to-end security without modification to applications. Further, IPSec is vendor-independent and can provide end-to-end security. Disadvantageously, however, IPSec has been considered as not being interoperable with NAT. In fact, the literature has so stated (see, e.g., N. Doraswamy and D. Harkins, "IPSEC: The New Security Standard for the Internet, Intranets and Virtual Private Networks," Prentice-Hall, $1^{st}$ ed., July 1999).

IPSec is an Internet standard from the IETF IPSec Working Group (see, e.g., S. Kent and R. Atkinson, "Security Architecture for the Internet Protocol," IETF, RFC 2401, November 1998). IPSec is a mandatory part of the next-generation IP protocol (IPv6, see, e.g., S. Deering and R. Hinden, "Internet Protocol, Version 6 (Ipv6) Specification," IETF, RFC 2460, December 1998), but most existing IPSec implementations assume current-generation IP (IPv4). IPSec is essentially an encapsulation protocol, namely one that defines the syntax and semantics of placing one packet inside another. IPSec defines two protocols, the Authentication Header (AH) protocol (see, e.g., S. Kent and R. Atkinson, "IP Authentication Header," IEFT, RFC 2402, November 1998) and Encapsulating Security Payload (ESP) protocol (see, e.g., S. Kent and R. Atkinson, "IP Encapsulating Security Payload (ESP)," IEFT, RFC 2406, November 1998). The AH protocol can provide authentication of packet origin, proof of integrity of packet data, and protection against packet replay. In addition to that which the AH protocol can provide, the ESP protocol can provide encryption of packet data and limited traffic flow confidentiality. The AH and ESP protocols can be used either in what are known as the transport or tunnel modes. The transport mode provides end-to-end security between the source of the packet and its destination. In contrast, the tunnel mode encapsulates packets and thus provides security between the nodes where the packet is encapsulated and decapsulated, which can be any nodes (e.g., routers) on the path between the source of the packet and its destination. Depending on the situation, clients might use different modes. Thus, for example, the transport mode may be used to download, via FTP, a document from a supplier's server, thus providing full authentication/security between the client and the server. On the other hand, the tunnel mode may be used by a client to connect to an IPSec gateway into an employer's Intranet.

Several problems hamper the interoperation of IPSec and NAT. For the AH protocol, when NAT translates an address, it would need to correspondingly adjust, through an ALG, the packet's authentication data, which depends on the packet's address. If the authentication data is not adjusted the packet will be rejected at the destination. In order for the NAT to modify the authentication data, however, the NAT would need to know the authentication key. Since that key is maintained private in order to protect the integrity of the security architecture, NAT is unable to modify the authentication data in the packet to compensate for the address translations. For the ESP protocol, interoperability with NAT is problematic in the transport mode. In the transport mode of the ESP protocol, when NAT translates the source or destination IP address, it would need to correspondingly adjust the TCP or UDP checksum, which is calculated over the packet's IP "pseudo-header," TCP or UDP header, and packet data. The pseudo-header includes the source and destination IP addresses. However, since the checksum is encrypted, along with the rest of the TCP or UDP header and data, NAT cannot make the necessary adjustment to this checksum without having access to the encryption key. For end-to-end security, the encryption key must not be revealed to intermediate nodes including NAT. Thus, NAT is not interoperable with the ESP protocol in the transport mode.

A problem therefore exists with respect to using network address translation with protocols, such as IPSec, that the NAT does not or cannot support.

SUMMARY OF THE INVENTION

In accordance with the present invention, the NAT is extended to be capable of providing network address translation of outgoing and incoming packets from and directed to clients, respectively, operating under a protocol that the NAT itself does not directly support such as, for example, IPSec. This is achieved with the extensible NAT of the present invention which, upon receiving a request from a client that defines for an unsupported protocol, a generalized port number (GPN) and its location within the packet. A global IP address and global GPN are then assigned and associated with the client's private IP address and GPN for packets sent to and received from a specified foreign address. An entry is then installed in the NAT's translation table, in memory, that defines for that protocol the association between the client's private IP address and GPN and the assigned global IP address and GPN for communication with the specified foreign address until a specified or default expiration time. Outgoing packets from a client using that protocol and having as a source address that private IP address and that private GPN and having that foreign address as their destination, will have their source address translated to the global IP address and their private source GPN translated to the global GPN, as defined by that entry in the translation table. Similarly, incoming packets using that protocol and having as their source address that foreign address, and having the global IP address as their destination address, will have their destination address translated to the private IP address and their destination GPN translated to the private GPN. Such translations in outgoing and incoming packets continue until the expiration time of the entry in the translation table, which may be extended in response to a request from a client.

Since the NAT does not have an ALG for an unsupported protocol, an ALG that would otherwise be implemented at the NAT is implemented instead at the client to perform any necessary functions on the packet payload and/or headers. The client having a client-implemented ALG is therefore enabled to communicate with a foreign address using a protocol that is not directly supported by NAT. In particular, a security protocol suite, such as IPSec, which is incompatible with NAT due to the inability of NAT to perform necessary modifications within the packet, can be used in order to ensure end-to-end security. Besides implementing the necessary ALGs, the client pre-compensates outgoing packets before they are transmitted and post-compensates incoming packets for the effects on the packets of the NAT's translations. The inclusion at the client of the necessary ALGs and pre and post compensation by the client is the subject of the afore-noted co-pending patent application Ser. No. 09/698,978, filed on even date hereof. Specifically, for the IPSec protocol, each outgoing packet is modified by the client before being processed for authentication and encryption (the latter, if using ESP protocol) to pre-compensate for the effect of the NAT translations on the cryptographic or noncryptographic checksums. Thus, when the packet is received at its destination and authenticated and decrypted (the latter, if using ESP protocol), the checksum calculated for that packet will be in accord with the transmitted checksum that was incorporated into and transmitted in the packet. Thus, absent a transmission error, the packet will not be dropped by the receiver. Specifically, before the packet is authenticated and encrypted (the latter, if using ESP protocol), private IP addresses and port numbers that NAT will not translate are replaced by corresponding assigned global values; the TCP or UDP checksum is modified to account for all the translations in the packet from private IP addresses and port numbers to global IP addresses and port numbers in such a manner that when NAT performs its translation operations and the packet is sent to its destination, the modified checksum matches, absent a transmission error, the actual checksum of the packet as operated on by NAT; and the AH authentication data (for AH protocol) is computed as if the source IP address were equal to the global IP address. For an incoming packet from the network, in a similar manner, the AH authentication data (for AH protocol) is computed as if the destination IP address were equal to the global IP address. After the packet is then authenticated and decrypted (the latter, if using ESP protocol) by the client, it is modified so as to post-compensate for the effect of the NAT translations on the cryptographic or noncryptographic checksums. Specifically, the client replaces those global IP addresses and port numbers in the packet that NAT has not translated with their corresponding private values. Further, the TCP or UDP checksum is modified to compensate for the translations made by the client and the NAT to the IP addresses and port numbers so that the modified checksum matches, absent a transmission error, the checksum calculated over the address-translated packet.

DETAILED DESCRIPTION

Figure 1:
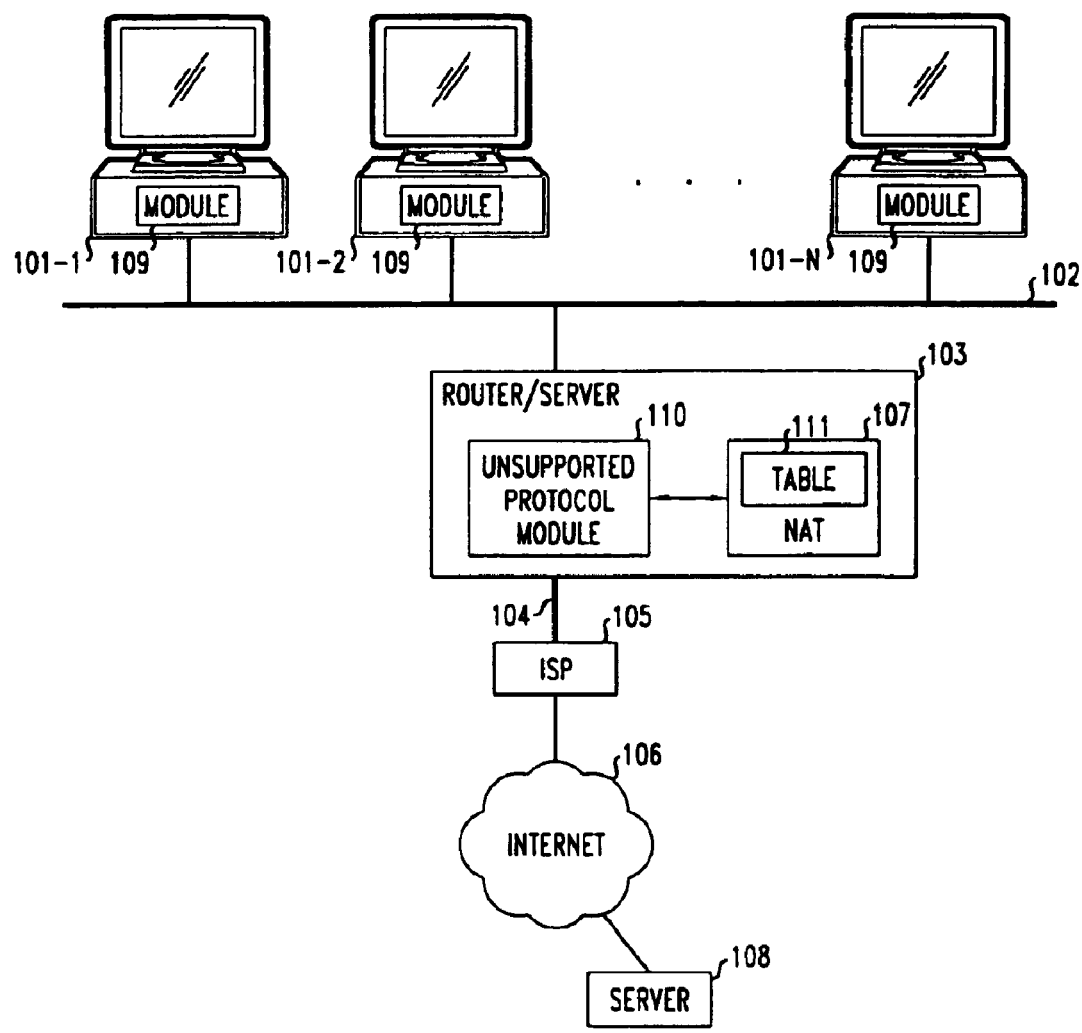
FIG. 1 shows a network architecture in which a plurality of clients are connected through a local high-bandwidth network to a local router/server, which is extensible to handle unsupported protocols such as IPSec and which performs the NAT operations that enable communication to and from the Internet.

With reference to FIG. 1, a plurality of clients 101-1–101-N are connected on a local network 102. The local network 102 can be an Ethernet, a WaveLAN, or any other private network to which a plurality of operative clients can be simultaneously connected. The local network 102 is connected to a local router/server 103, which in turn is connected over a shared high-bandwidth link 104 to an ISP 105, which provides access to the Internet 106. Link 104 can be, for example, a cable, a DSL, or a T1 line. A hotel, an airport lounge, a conference center, are examples of facilities at which a shared link could provide Internet connectivity to a plurality of users for connection of their portable PCs. In order to enable the plural clients 101-1–101-N to share the link 104, each client is assigned a private IP address by the local router/server 103. As previously noted, the non-permanent IP addresses assigned to these clients are from the set of non-routable IP addresses allocated by IANA for private network use. Router/server 103 is assigned one or more routable IP addresses by ISP 105. In order for the plural clients 101-1–101-N to share link 104, router/server 103 incorporates NAT 107 software module. As previously noted, NAT 107 translates the private IP address and GPN used by each client 101-1–101-N to a global address and global GPN associated with router/server 103. For the TCP or UDP protocol, for example, where the GPN is the port number, NAT 107 translates in each outgoing packet from a client, its source private IP address and port number to a uniquely associated global IP address and port number. Incoming packets addressed to that global IP address and port number are then translated back by NAT 107 to the local private IP address and port number of the particular client to which they are properly directed. In this manner, through the use of NAT, the plural clients 101-1–101-N can share the common link 104.

In order to prevent one client from forging or snooping on the packets sent or received from another one of the clients connected on the same private network, authentication and encryption can be used. As previously mentioned, IPSec can provide end-to-end security (authentication and/or encryption) without modifications to applications. In order to use an authentication/encryption security protocol suite such as IPSec, however, a client needs to modify each outgoing packet and incoming packet by performing IP address and GPN translations that the NAT 107 is unable to perform without having access to authentication and/or encryption/decryption keys, and by modifying a TCP or UDP checksum to compensate for the translations performed locally and by NAT 107. Further, since NAT 107 cannot incorporate an ALG to perform those functionalities that need to be performed on the outgoing packets without corrupting the packet, an outgoing packet is operated upon by the source client of that packet to process any necessary ALG. In a similar manner, each incoming packet that originated at a server 108 connected on Internet 106 and is received by a client 101-1–101-N from the router/server 103, is post-compensated after the packet has been decrypted and authenticated. As in the outgoing case, the client operates on the resultant packet to process any ALG that needs to be performed and to perform translations of global IP addresses and global GPNs to local IP addresses and local GPNs that the NAT is unable to do, and to modify the TCP or UDP checksum to compensate for the translations made to the packet either locally by the client or by the NAT itself. Both the pre-compensation and post compensation, to be described in more detail herein below, are effected through an IPSec/Nat interoperability client module 109 included within each client 101-1–101-N.

Figure 2:
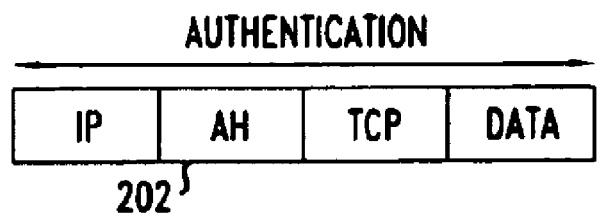
FIG. 2 shows the IPSec packet format for the AH protocol in the transport mode.
Figure 3:
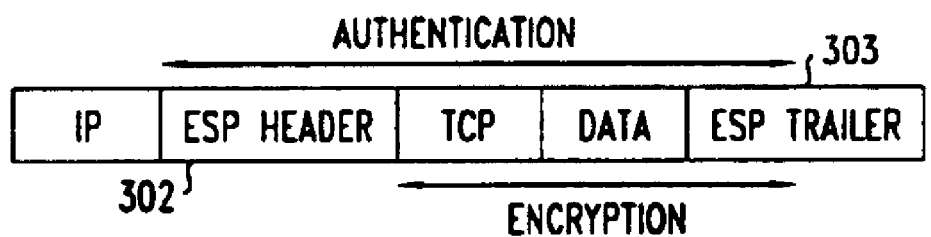
FIG. 3 shows the IPSec packet format for the ESP protocol in the transport mode.
Figure 4:
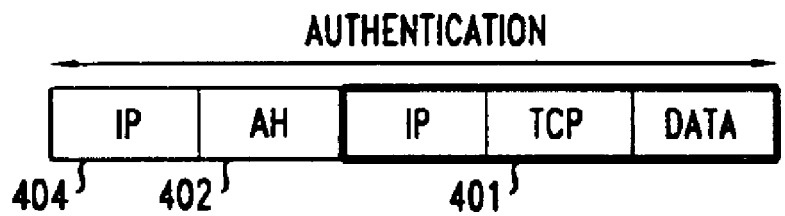
FIG. 4 shows the IPSec packet format for the AH protocol in the tunnel mode.
Figures 5, 6:
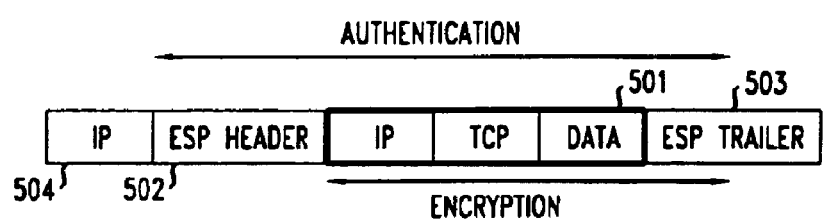
FIG. 5 shows the IPSec packet format for the ESP protocol in the tunnel mode.
FIG. 6 shows an entry in a NAT translation table that enables unambiguous translation of IP addresses and port numbers by the NAT.

As previously mentioned, the IPSec security format defines two protocols: the AH (Authentication Header) protocol and the ESP (Encapsulating Security Payload) protocol. The AH protocol can provide authentication of packet origin, proof of integrity of packet data, and protection against packet replay. The ESP protocol can provide, in addition to the AH protocol's services, encryption of packet data and limited traffic flow confidentiality. The AH and ESP protocols can be used either in the transport or tunnel mode. The transport mode provides end-to-end security between the source of the packet and its destination. In contrast, the tunnel mode encapsulates packets and thus provides security between the nodes at which the packet is encapsulated and decapsulated. These nodes can be any nodes on the path between the packet's source and destination. FIG. 2 shows the packet layout for the AH protocol in the transport mode; FIG. 3 shows the packet layout for the ESP protocol in the transport mode; FIG. 4 shows the packet layout for the AH protocol in the tunnel mode; and FIG. 5 shows the packet layout for the ESP protocol in the tunnel mode. In the tunnel mode, in FIGS. 4 and 5, the encapsulated packets, 401 and 501, respectively, are shown in bold. The portion of the packet that is authenticated or encrypted is different for the AH and ESP protocols. The AH and ESP protocols insert a header (202 in FIG. 2 and 302 in FIG. 3) between the IP header and the upper-layer UDP or TCP header in the transport mode. In the tunnel mode the header (402 in FIG. 4 and 502 in FIG. 5) is inserted between the IP header and the encapsulated IP datagram. The ESP protocol also appends a packet trailer (303 in FIG. 3 and 503 in FIG. 5). In the tunnel mode, the IP header (404 in FIG. 4 and 504 in FIG. 5), may have source and destination IP addresses different from those of the encapsulated packet. In the AH protocol, authentication covers the entire IP datagram, as can be noted in FIGS. 2 and 4. On the other hand, as can be seen in FIGS. 3 and 5, with the ESP protocol, authentication skips the IP header and the final part of the ESP trailer, which contains the authentication data. In the ESP protocol, encryption skips both the IP and ESP headers and the final part of the ESP trailer.

Additional functionality is added to the router/server 103 in FIG. 1 through an Unsupported-Protocol Module 110 in order to provide interoperability between the NAT and those clients that are using a protocol that is not or cannot be directly supported by the NAT as, for example, the above-described IPSec AH and ESP protocols in both the transport and tunnel modes. For any such protocol that is not supported by NAT, clients need a client-implemented ALG to perform necessary modifications in packet payloads to compensate for NAT translations. To implement such an ALG, clients communicate with the router/server 103 to install entries in the NAT's translation tables 111, stored in memory. For those entries installed at the request of a client (called client-ALG entries), NAT assumes that any necessary ALG is implemented at the corresponding client. On the other hand, for protocols that are supported by directly by NAT and whose entries are installed by NAT without an explicit request by a client (designated as NAT-ALG entries), NAT performs any ALG that may be necessary. NAT-ALG entries have the advantage of being transparent to end hosts, providing backward compatibility. This is only possible, however, for protocols for which the NAT implementation includes the necessary ALG. Client-ALG entries advantageously provide support for those protocols that cannot otherwise be supported.

In order to enable NAT 107 to properly handle protocols which NAT does not directly support, NAT clients communicate with module 110 in router/server 103 to define, for a specified protocol, the GPN in terms of the underlying protocol and port number, the offsets of the source and destination fields from the end of the underlying protocol's header, the field lengths, and a value range for the GPN. The client also defines a GPN value that will be used to represent an "unspecified" GPN that, rather than being selected by the client, is to be selected by the NAT router/server. If the client specifies a protocol for which NAT 107 has the corresponding ALG, the router/server 103 returns an error code to the requesting client, and the client does not use client-ALG entries. Assuming that NAT does not have the corresponding ALG, module 110 in router/server 103 then allocates, for the specified protocol and up to a specified expiration time, a global IP address and global GPN for communications between the client's private IP address and private GPN and a given foreign address. In such an allocation request, the client needs to specify at least the protocol and the private IP address. The client may, however, declare the foreign IP address to be a value that matches any foreign IP address. The client leaves the global IP address and global GPN unspecified and may also leave the private GPN and/or the expiration time unspecified. If the client does not specify the private GPN, module 110 in router/server 103 selects the same value for the private and global GPNs. If the expiration time is left unspecified, module 110 in router/server 103 chooses the present time plus a default interval. Module 110 then selects a global IP address/global GPN combination such that, for the specified protocol and foreign address, at most one private IP address/private GPN combination is associated with that global IP address/global GPN. All selected values are returned to the client and a translation table entry of the type shown in FIG. 6 is installed in the translation table 111 of NAT 107.

As can be noted in FIG. 6, the entry in the translation table includes a protocol field 601, which provides an indication of the particular protocol being used for transmission; a field 602 for the private IP address of the particular client 101-1–101-N, for example, on the local network 102; a field 603 for private GPN for that particular client; a field 604 for the global IP address assigned by router/server 103 for this communication; a field 605 for the global GPN also assigned by router/server 103; a field 606 for the foreign address with which the client is communicating; and a field 607 for the time at which lease of these global addresses expires.

When NAT 107 receives a packet destined to a foreign IP address from a client, NAT 107 looks in its translation table for an entry whose protocol matches the protocol in the header of the packet, which private IP address and private GPN match the packet's source IP address and GPN, and whose foreign IP address matches the packet's destination IP address. If such an entry is found, NAT 107 translates the packet's source IP address and GPN from private to global values according to the matching entry. Otherwise, if NAT 107 has an ALG for the packet's protocol or if none is needed, NAT 107 automatically allocates a NAT-ALG entry in its translation table and translates the packet according to it, or else NAT 107 drops the packet.

Conversely, when router/server 104 receives from a foreign address a packet destined to one of its global IP addresses, NAT 107 looks in its translation table for an entry whose protocol matches the protocol in the packet's header, whose global IP address and global GPN match the packet's destination IP address and GPN, and whose foreign IP address matches the packet's source IP address. If such an entry is found, NAT 107 translates the packet's destination IP address and GPN from the global values to the private values according to the matching entry. Otherwise, NAT 107 drops the packet.

When a translation table entry reaches its expiration time, the entry is erased. Alternatively, the client may renew its lease through a request for either a default period of time or a requested period of time by fully specifying the protocol, global GPN, global IP address, and foreign IP address as they already exist in the entry. Module 110 in router/server 103 upon recognizing that an entry for those parameter values already exists, renews the lease for the requested or default period of time. A client may alternatively request a deallocation of an entry in the translation table upon completing communication with the foreign address specified in the entry.

Figure 7:
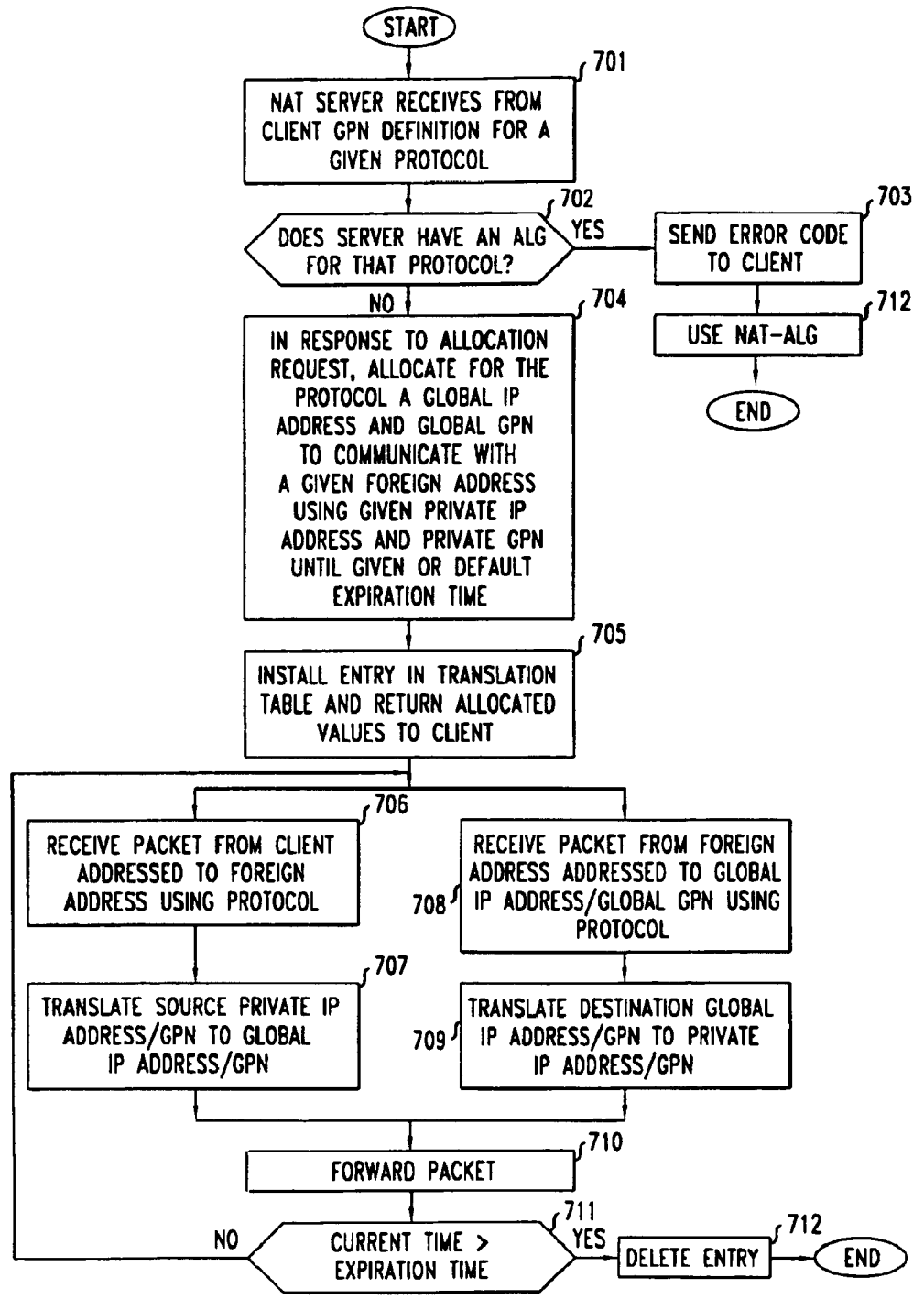
FIG. 7 is a flowchart showing the steps performed by the extensible router/server of the present invention that enable it to process packets to and from a client using an unsupported protocol.

FIG. 7 is a flowchart showing some of the steps described above that are performed by the NAT router/server 103 to enable clients to use protocols that NAT 107 does not directly support. At step 701, the NAT router/server receives from a client the definition of the GPN for a specified protocol. At step 702, a determination is made whether the router/server has an ALG for that protocol. If yes, at step 703, an error code is sent to the client. If, at step 702, the server does not have an ALG for the specified protocol, then, at step 704, in response to an allocation request from the client, the NAT router/server allocates for the given protocol, a global IP address and global GPN for communication with a given foreign address using a given private IP address and private GPN until a given or default expiration time. At step 705, an entry is installed in the NAT's translation table and the allocated values are returned to the client. At step 706, the NAT server receives a packet having a destination address of the specified foreign address and using the specified protocol. At step 707, the NAT translates the private IP address/GPN source data to the global IP address/GPN according to translation table. Thereafter, or in parallel, at step 708, the NAT router/server receives a packet from the specified foreign address that is addressed to the global IP address with the global GPN and using the specified protocol. At step 709, the NAT, finding the appropriate entry in its translation table, translates the global IP address/GPN destination data to the private IP address/GPN. Following step 707 or 709, at step 710, the packet is forwarded to its destination. At step 711, a determination is made whether the current time has exceeded the specified expiration time of the entry. If not, packet processing to and from the client continues. If yes, at step 712, the entry is deleted.

The preceding methodology can be applied to the previously described unsupported IPSec protocol. In addition to the AH and ESP protocols in the tunnel or transport mode, the ISAKMP (Internet Security Association and Key Management Protocol) (see, e.g., D. Maughan, M. Schertler, M. Schneider and J. Turner, "Internet Security Association and Key Management Protocol (ISAKMP)," IETF, RFC 2408, November 1998), is part of the IPSec protocol suite used by IPSec peers to negotiate which security services to implement (e.g., authentication and/or encryption) and which algorithms and keys to use. In addition to MD5 (see, e.g., C. Madson and R. Glenn, "The Use of HMAC-MD5-96 within ESP and AH," IETF, RFC 2403, November 1998) and SHA (see, e.g., C. Madson and R. Glenn, "The Use of HMAC-SHA-1-96 within ESP and AH," IETF, RFC 2404, November 1998) for authentication and DES (see, e.g., C. Madson and N. Doraswamy, "The ESP DES-CBC Cipher Algorithm with Explicit IV," IETF, RFC 2405, November 1998) for encryption, IPSec implementations may support other algorithms. The choice of services, algorithms, and keys is called a security association (SA). The framework for SA negotiation is defined by ISAKMP. ISAKMP is layered on top of UDP and uses UDP port 500 for both its source and destination. IPSec's negotiation is more specifically defined by IKE (Internet Key Exchange) (see, e.g., D. Harkins and D. Carrel, "The Internet Key Exchange (IKE)," IETF, RFC 2409, November 1998). An IPSec packet's SA is uniquely identified by the protocol (AH or ESP) and destination IP address in the IP header, in conjunction with the SPI (Security Parameters Index), a 32-bit field in the AH or ESP header.

During the negotiation governed by the ISAKMP protocol, the GPN is an initiator cookie, a 64-bit field present in all ISKAMP packets during a negotiation session. Clients declare to the router/server that ISAKMP GPNs have a 0-bit offset from the end of the UDP header both for source and destination, and have a 64-bit length. The router/server thus knows where the GPN field begins and how many bits it occupies. Before using an initiator cookie in an ISAKMP negotiation, a local client 101-1–101-N leases the global IP address and cookie from the router/server 103, leaving both private and global GPN unspecified. This prevents NAT demultiplexing errors due to two or more of the local clients 101-1–101-N using the same global IP address and cookie to communicate with a same foreign address using the same protocol. Because the client leaves both the private and global GPNs unspecified, the router/server 103 chooses them to be the same. The NAT thus translates only IP addresses, the cookie being translated to its same value.

For the IPSec AH and ESP protocols, the underlying protocol is IP, and the GPN is the incoming SPI. For these protocols clients declare to the server that the GPN has a 0-bit offset from the end of the IP header both for source and destination, and has a 32-bit length. Before an SPI is selected in an ISAKMP negotiation, the incoming SPI is leased from router/server 103, again leaving both the private and global GPN unspecified. As with the initiator cookie, this guarantees that no two clients will be using the same SPI to communicate with the same foreign IP address using the same protocol, thereby avoiding potential demultiplexing errors. By leaving both the private and global GPNs unspecified, router/server 103 chooses them to be the same. Thus, as with the cookie, NAT 107 translates only IP addresses and translates incoming SPIs to the same values.

Since, as previously described, due to the proper lack of access to the authentication and encryption codes used in a secure IPSec protocol-based communication, the NAT is unable to perform any ALG for IPSec packets. Rather, an IPSec ALG is installed in clients to compensate for the effects of the NAT's IP address translations in IPSec packets. Such an ALG is possible at a client because the ALG is co-located with one of the IPSec endpoints and revealing the secret keys used in the secure transmission to the ALG does not violate end-to-end security. Without an ALG, however, a packet will be dropped when it arrives at its foreign address destination due to the deleterious effect that the NAT translation causes upon packet authentication verification and TCP/UDP checksum calculations. Accordingly, in order to avoid the effects of NAT translations, module 109 in the client modifies each outgoing packet before authentication and encryption to pre-compensate for those translation-induced effects and performs any ALG that might be necessary but which cannot be performed by the NAT. Similarly, after each incoming packet from the foreign address is authenticated and decrypted, any necessary ALG is processed by module 109 in the client and the packet is modified to post-compensate for the effects of the NAT translations.

For full interoperability with NAT, clients using an unsupported protocol such as the IPSec security protocol suite, should follow the prescribed methodology when the source IP address is private but the destination IP address is global, or vice-versa. In such cases, as when as previously described the clients are connected on a private network, NAT is necessary. The following procedures should then be followed when using IPSec:

1. As previously described, before using an initiator cookie in an ISAKMP negotiation, the client leases a global IP address and cookie from router/server 103 to prevent NAT demultiplexing errors due to two or more local clients from using the same global IP address and cookie.

2. For similar reasons, and as previously noted, before selecting an incoming SPI in an ISAKMP negotiation, the client leases the incoming SPI from the router/server 103, keeping the global IP address as in the first step above.

3. For each outgoing packet, before authentication and encryption, the following steps are performed:
   (i) in the transport mode, replace the source port number by a global port number since the NAT will not translate that port number in the TCP or UDP header;
   (ii) in the tunnel mode, replace the encapsulated source IP address and port number by a global IP address and port number so that when the packet is decapsulated at the receiving end, a reply packet can properly have as its destination address that global address and global port number rather than the unaddressable private IP address on local network 102;
   (iii) modify the TCP or UDP checksum by adding to the TCP or UDP checksum incorporated in the TCP or UDP header: (a) the difference between the global and private source IP addresses, and (b) the difference between the global and private source port numbers in order to compensate for the changes made to the packet in these steps or that will be made to the packet by the NAT translation; and
   (iv) process any ALG that may be necessary.

4. Then, for the AH protocol, given that NAT will be translating the source IP address to the previously leased global IP address, compute the packet's AH authentication data as if the source IP address were equal to that global IP address and incorporate that authentication data into the AH header.

5. As previously noted, periodically renew leases for global IP addresses, initiator cookies, incoming SPIs, and global port number, while needed.

From step 4, when NAT performs its translation and the packet is received at its destination at the foreign address, the packet will be properly authenticated if no transmission errors have occurred. From step 3, when the TCP or UDP checksum is computed over the received authenticated and decrypted packet, it will match, absent a transmission error, the modified TCP or UDP checksum that is incorporated in the TCP or UDP header, at the client, before authentication and encryption.

For incoming packets, steps 3 and 4 are replaced as follows:

3'. For the AH protocol, compute each packet's authentication data as if the destination IP address were equal to the global IP address, since it was with that global IP address as the destination that the authentication data was originally computed when the packet was sent from the foreign address.

4'. After authentication and decryption, the following steps are performed:

(i') process any necessary ALG;

(ii') in the transport mode, replace the global destination port number by the corresponding private port number, since NAT did not perform such translation;

(iii') in the tunnel mode, replace in the decapsulated packet the global destination IP address and port number by the corresponding private address and port number, since such translations are not performed by NAT; and (iv') subtract from the TCP or UDP checksum in the packet (a) the difference between global and private destination IP addresses, and (b) the difference between global and private destination port number, to compensate for the translations made in the packet by the client or by NAT.

When the client computes the checksum over the received packet after translations made by NAT and steps (i') through (iv') above, the checksum will be correct, absent a transmission error.

Figure 8:
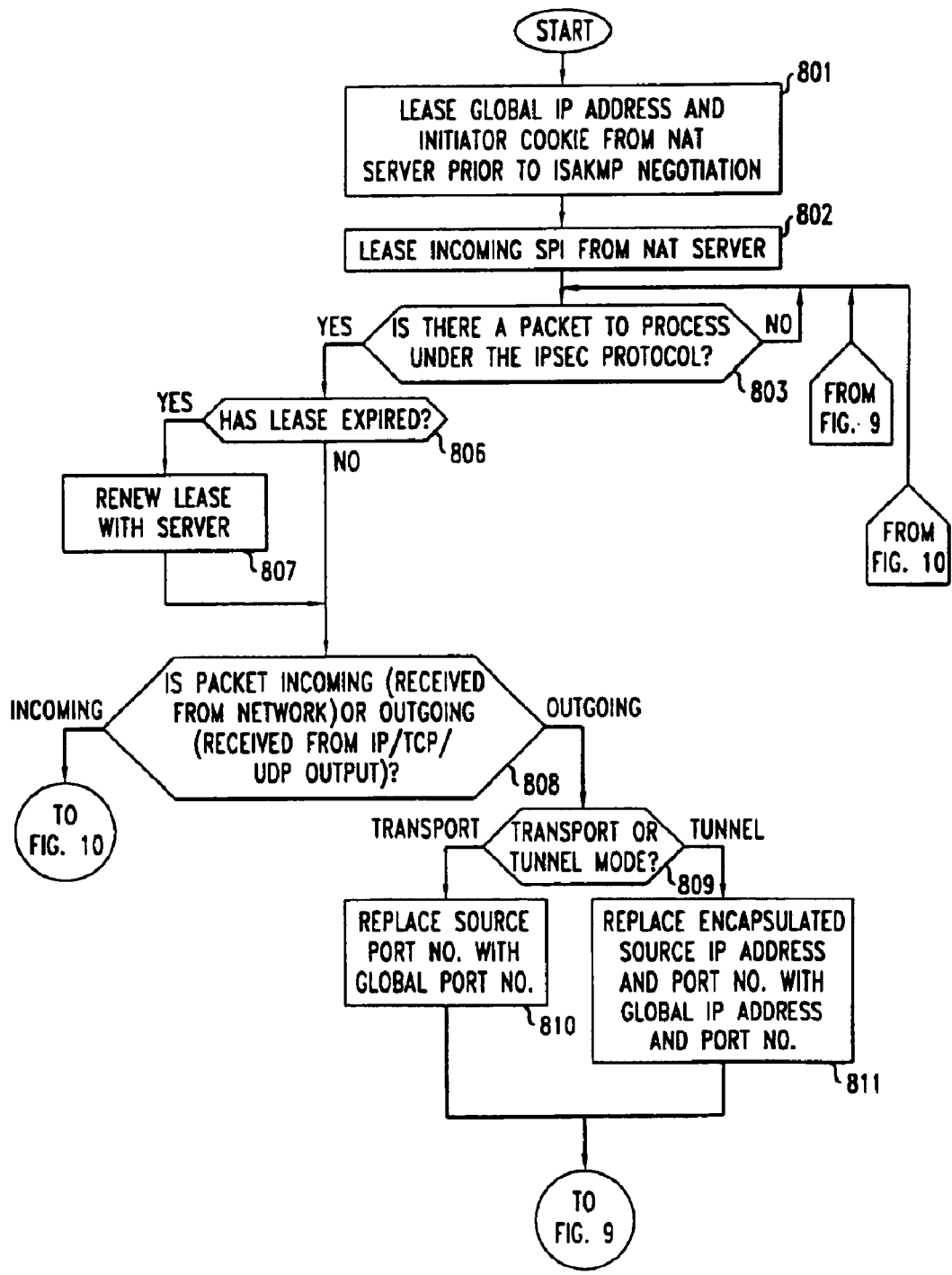
FIGS. 8–10 together are a flowchart detailing the steps, from a local client's standpoint, that provide interoperability with the extensible NAT router/server and NAT using the unsupported IPSec security protocol.
Figure 9:
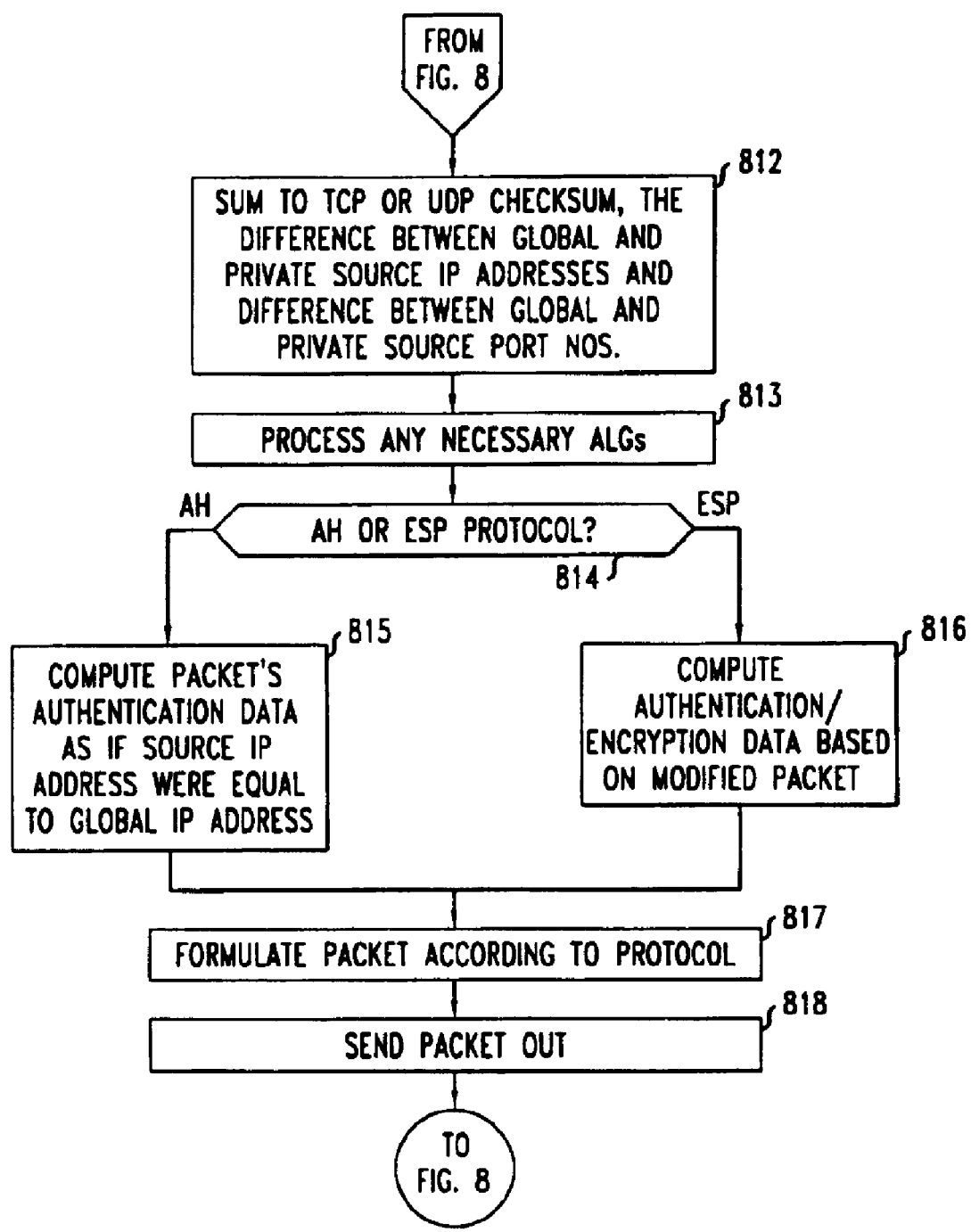
Figure 10:
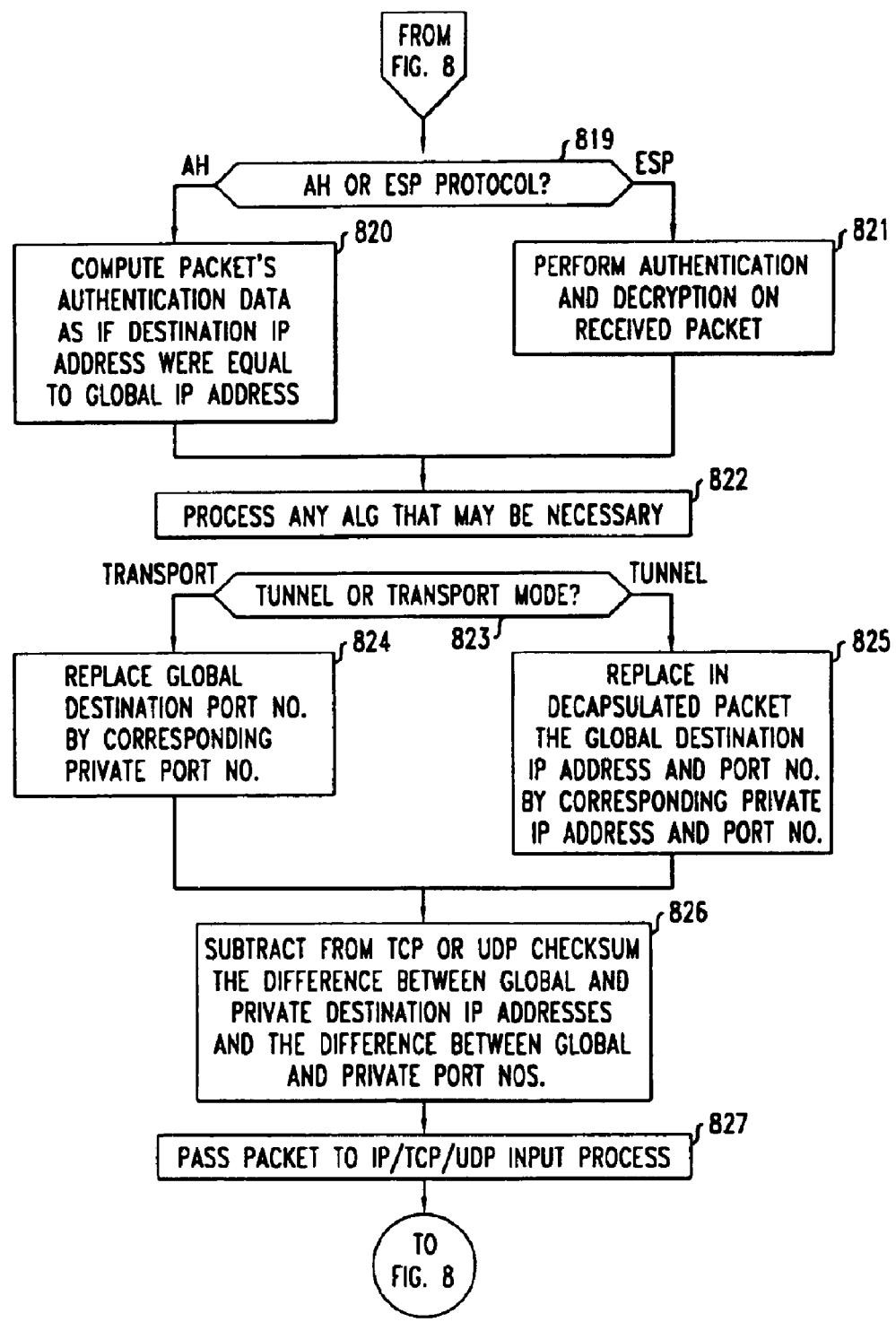

With reference to the flowchart in FIGS. 8–10, the steps from a local client's standpoint are shown that provide interoperability of NAT and IPSec, as described above. At step 801, the global IP address and initiator cookie are leased from the NAT router/server prior to an ISAKMP negotiation. At step 802, the incoming SPI is similarly leased from the NAT router/server. At step 803, a determination is made whether there is a packet to be processed under the IPSec protocol. If not, the program flow is fed back to step 803 until there is a packet to process. If, at step 803, there is a packet to be processed, then, at step 806, a determination is made whether the leases have expired. If yes, then, at step 807, the leases are renewed with the NAT router/server. If the leases have not expired, or after the leases have been renewed, a determination is made, at step 808, whether the packet is incoming (received from the local network) or outgoing (received from the client's IP/TCP/UDP output). If it is an outgoing packet, then, at step 809, a determination is made whether the transport or tunnel mode is to be used. If the transport mode is to be used, at step 810, the source port number in the packet is replaced with a global port number. If the tunnel mode is to be used, then, at step 811, the encapsulated source IP address and port number are replaced by the global IP address and global port number. After either steps 810 or 811, at step 812 (FIG. 9), the difference between the global and private source IP addresses and the difference between the global and private source port numbers are added to the TCP or UDP checksum. At step 813, any necessary ALGs are processed. At step 814, a determination is made whether the AH or ESP protocol is being used. If the AH protocol is being used, then, at step 815, the packet's authentication data is computed as if the source IP address were equal to the global IP address. If the ESP protocol is being used, at step 816, the authentication and encryption data for the modified packet is computed. After either steps 815 or 816, at step 817, the packet is formulated according to the protocol and mode and, at step 818, the packet is sent to the NAT router/server. The program flow then returns to step 803 (FIG. 8) for processing of another packet. If, at step 808, an incoming packet is to be processed, then, at step 819 (FIG. 10), a determination is made whether the protocol of that packet is AH or ESP. If the protocol is AH, at step 820, the packet's authentication data is computed as if the destination IP address were equal to the global IP address. If the protocol is ESP, at step 821, authentication and decryption are performed on the received incoming packet. Following either steps 820 or 821, at step 822, any necessary ALGs are processed. At step 823, a determination is made whether the transport or tunnel modes were used. If the transport mode was used, then at step 824, the global destination port number is replaced by the corresponding private port number. If the tunnel mode was used, then at step 825, the global destination IP address and port number are replaced in the decapsulated packet by the corresponding private address and port number. Following either steps 824 or 825, at step 826, the difference between the global and private destination IP addresses and the difference between the global and private port numbers are subtracted from the TCP or UDP checksum in the packet. At step 827, the modified packet is passed to an IP/TCP/UDP input process. The program flow then returns to step 803 (FIG. 8) for processing of another packet.

Although described in conjunction with the IPSec security protocol, it should be apparent to one skilled in the art that network address translation can be extended to handle any protocol that the NAT and its associated server do not themselves support. Similarly the pre and post compensation and the incorporation of necessary ALGs at a client that is using a protocol not supported by the NAT and which the client needs to connect to the Internet or other packet-based network can likewise be extended to any such unsupported protocol.

Although router/server 107 are shown as a single entity, one skilled in the art will realize that the router and server could be separate entities and that the NAT and the server could be on separate entities. Further, the client modules 109 and server module 110 are described as software modules and are preferably implemented as such, but they also could be implemented in hardware. As software modules, they could be implemented in RAM, ROM, or any other computer readable medium.

The foregoing merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language that were recited herein were principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views embodying the principles of the invention. Similarly, it will be appreciated that any flowcharts, and the like represent various processes which may be substantially represented in computer readable medium and so executed by a computer or processor, whether or not such computer or processor is explicitly shown.

The functions of the various elements shown in the FIGS., may be provided through the use of dedicated hardware as well as hardware capable of executing software in association with appropriate software. When provided by a processor, the functions may be provided by a single dedicated processor, by a single shared processor, or by a plurality of individual processors, some of which may be shared.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

The invention claimed is:

1. A method comprising:

receiving a request from a client at a network address translator (NAT) that defines for a protocol not directly supported by the NAT a generalized port number (GPN) associated with that unsupported protocol and its location in each packet, the location comprising an indication of a bit position within a packet of where the GPN begins and a length of the GPN;

creating an entry in a translation table of the NAT that defines for that protocol an association between a client's private IP address and GPN, a NAT's assigned global IP address and GPN, and a foreign IP address, said entry being used for translating in outgoing packets received by the NAT from the client using that protocol and having the foreign IP address as their destination, the client's private source IP address and GPN to the NAT's global IP address and GPN, respectively, and for translating in incoming packets sent from the foreign IP address using that protocol to the NAT's global destination IP address and GPN, the NAT's global destination IP address and GPN to the client's private destination IP address and GPN, respectively.

2. A method comprising:

receiving a request from a client at a network address translator (NAT) that defines for a protocol not directly supported by the NAT a generalized port number (GPN) associated with that unsupported protocol and its location in each packet, the location comprising an indication of a bit position within a packet of where the GPN begins and a length of the GPN;

creating an entry in a translation table of the NAT that defines for that protocol an association between a client's private IP address and GPN, NAT's assigned global IP address and GPN, and a foreign IP address; and in outgoing packets received by the NAT from the client using that protocol and having the foreign IP address as their destination, translating in accordance with the entry, the client's private source IP address and GPN to the NAT's global IP address and GPN, respectively.

3. A method comprising:

receiving a request from a client at a network address translator (NAT) that defines for a protocol not directly supported by the NAT a generalized port number (GPN) associated with that unsupported protocol and its location in each packet, the location comprising an indication of a bit position within a packet of where the GPN begins and a length of the GPN;

creating an entry in a translation table of the NAT that defines for that protocol an association between a client's private IP address and GPN, a NAT's assigned global IP address and GPN, and a foreign IP address; and in incoming packets received by the NAT and sent from the foreign IP address using that protocol to the NAT's global destination IP address and GPN, translating in accordance with the entry, the NAT's global destination IP address and GPN to the client's private destination IP address and GPN, respectively.

4. The method of claim 1, 2 or 3 wherein the entry further defines an expiration time until which the entry is valid for translating packets.

5. The method of claim 1, 2 or 3 wherein the unsupported protocol is a protocol in the IP Security (IPSec) security protocol suite.

6. The method of claim 5 wherein the unsupported protocol in the IPSec security suite is the Internet Security Association and Key Management Protocol (ISAKMP) and the GPN is an initiator cookie leased from the NAT to be unique to the client.

7. The method of claim 6 wherein the leased initiator cookie is chosen by the NAT to be used as both the client's GPN and the NAT's GPN.

8. The method of claim 5 wherein the unsupported protocol in the IPSec security suite is the AH or ESP protocol in either the tunnel or transport modes, and the GPN is an incoming Security Parameter Index (SPI) leased from the NAT to be unique to the client.

9. The method of claim 8 wherein the leased SPI is chosen by the NAT to be used as both the client's GPN and the NAT's GPN.

10. A network address translator (NAT) comprising:

means for receiving a request from a client that defines for a protocol not directly supported by the NAT a generalized port number (GPN) associated with that unsupported protocol and its location in each packet, the location comprising an indication of a bit position within a packet of where the GPN begins and a length of the GPN;

memory means for storing a translation table;

means for creating an entry in the translation table that defines for that protocol an association between a client's private IP address and GPN, a NAT's assigned global IP address and GPN, and a foreign IP address, said entry being used for translating in outgoing packets received by the NAT from the client using that protocol and having the foreign IP address as their destination, the client's private source IP address and GPN to the NAT's global IP address and GPN, respectively, and for translating in incoming packets sent from the foreign IP address using that protocol to the NAT's global destination IP address and GPN, the NAT's global destination IP address and GPN to the client's private destination IP address and GPN, respectively.

11. A network address translator (NAT) comprising:
means for receiving a request from a client at a network address translator (NAT) that defines for a protocol not directly supported by the NAT a generalized port number (GPN) associated with that unsupported protocol and its location in each received packet, the location comprising an indication of a bit position within a packet of where the GPN begins and a length of the GPN;
memory means for storing a translation table;
means for creating an entry in the translation table that defines for that protocol an association between a client's private IP address and GPN, NAT's assigned global IP address and GPN, and a foreign IP address; and
means for, in outgoing packets received by the NAT from the client using that protocol and having the foreign IP address as their destination, translating in accordance with the entry, the client's private source IP address and GPN to the NAT's global IP address and GPN, respectively.

12. A network address translator (NAT) comprising:
means for receiving a request from a client that defines for a protocol not directly supported by the NAT a generalized port number (GPN) associated with that unsupported protocol and its location in each packet, the location comprising an indication of a bit position within a packet of where the GPN begins and a length of the GPN;
memory means for storing a translation table;
means for creating an entry in the translation table that defines for that protocol an association between a client's private IP address and GPN, a NAT's assigned global IP address and GPN, and a foreign IP address; and
means for, in incoming packets received by the NAT and sent from the foreign IP address using that protocol to the NAT's global destination IP address and GPN, translating in accordance with the entry, the NAT's global destination IP address and GPN to the client's private destination IP address and GPN, respectively.

13. The NAT of claim 10, 11 or 12 wherein the entry further defines an expiration time until which the entry is valid for translating packets.

14. The NAT of claim 10, 11 or 12 wherein the unsupported protocol is a protocol in the IP Security (IPSec) security protocol suite.

15. The NAT of claim 14 wherein the unsupported protocol in the IPSec security suite is the Internet Security Association and Key Management Protocol (ISAKMP) and the GPN is an initiator cookie leased from the NAT to be unique to the client.

16. The NAT of claim 15 wherein the leased initiator cookie is chosen by the NAT to be used as both the client's GPN and the NAT's GPN.

17. The NAT of claim 14 wherein the unsupported protocol in the IPSec security suite is the AH or ESP protocols in tunnel or transport modes, and the GPN is an incoming Security Parameter Index (SPI) leased from the NAT to be unique to the client.

18. The NAT of claim 17 wherein the leased SPI is chosen by the NAT to be used as both the client's GPN and the NAT's GPN.

19. A computer readable media tangibly embodying a program of instructions executable by a computer to perform a method at a network address translator (NAT), the method comprising:
receiving a request from a client that defines for a protocol not directly supported by the NAT a generalized port number (GPN) associated with that unsupported protocol and its location in each packet, the location comprising an indication of a bit position within a packet of where the GPN begins and a length of the GPN;
creating an entry in a translation table of the NAT that defines for that protocol an association between a client's private IP address and GPN, a NAT's assigned global IP address and GPN, and a foreign IP address, said entry being used for translating in outgoing packets received by the NAT from the client using that protocol and having the foreign IP address as their destination, the client's private source IP address and GPN to the NAT's global IP address and GPN, respectively, and for translating in incoming packets sent from the foreign IP address using that protocol to the NAT's global destination IP address and GPN, the NAT's global destination IP address and GPN to the client's private destination IP address and GPN, respectively.

20. A computer readable media tangibly embodying a program of instructions executable by a computer to perform a method at a network address translator (NAT), the method comprising:
receiving a request from a client that defines for a protocol not directly supported by the NAT a generalized port number (GPN) associated with that unsupported protocol and its location in each packet, the location comprising an indication of a bit position within a packet of where the GPN begins and a length of the GPN;
creating an entry in a translation table of the NAT that defines for that protocol an association between a client's private IP address and GPN, NAT's assigned global IP address and GPN, and a foreign IP address; and
in outgoing packets received by the NAT from the client using that protocol and having the foreign IP address as their destination, translating in accordance with the entry, the client's private source IP address and GPN to the NAT's global IP address and GPN, respectively.

21. A computer readable media tangibly embodying a program of instructions executable by a computer to perform a method at a network address translator (NAT), the method comprising:
receiving a request from a client that defines for a protocol not directly supported by the NAT a generalized port number (GPN) associated with that unsupported protocol and its location in each packet, the location comprising an offset of the GPN within each packet and a length of the GPN;
creating an entry in a translation table of the NAT that defines for that protocol an association between a client's private IP address and GPN, a NAT's assigned global IP address and GPN, and a foreign IP address; and
in incoming packets received by the NAT and sent from the foreign IP address using that protocol to the NAT's global destination IP address and GPN, translating in accordance with the entry, the NAT's global destination IP address and GPN to the client's private destination IP address and GPN, respectively.

22. The media of claim 19, 20 or 21 where in the method the entry further defines an expiration time until which the entry is valid for translating packets.

23. The media of claim 19, 20 or 21 where in the method the unsupported protocol is a protocol in the IP Security (IPSec) security protocol suite.

24. The media of claim 23 wherein the unsupported protocol in the IPSec security suite is the Internet Security Association and Key Management Protocol (ISAKMP) and the GPN is an initiator cookie leased from the NAT to be unique to the client.

25. The media of claim 24 wherein the leased initiator cookie is chosen by the NAT to be used as both the client's GPN and the NAT's GPN.

26. The media of claim 23 wherein the unsupported protocol in the IPSec security suite is the AH or ESP protocol in either the tunnel or transport modes, and the GPN is an incoming Security Parameter Index (SPI) leased from the NAT to be unique to the client.

27. The method of claim 26 wherein the leased SPI is chosen by the NAT to be used as both the client's GPN and the NAT's GPN.

* * * * *